UNITED STATES PATENT OFFICE.

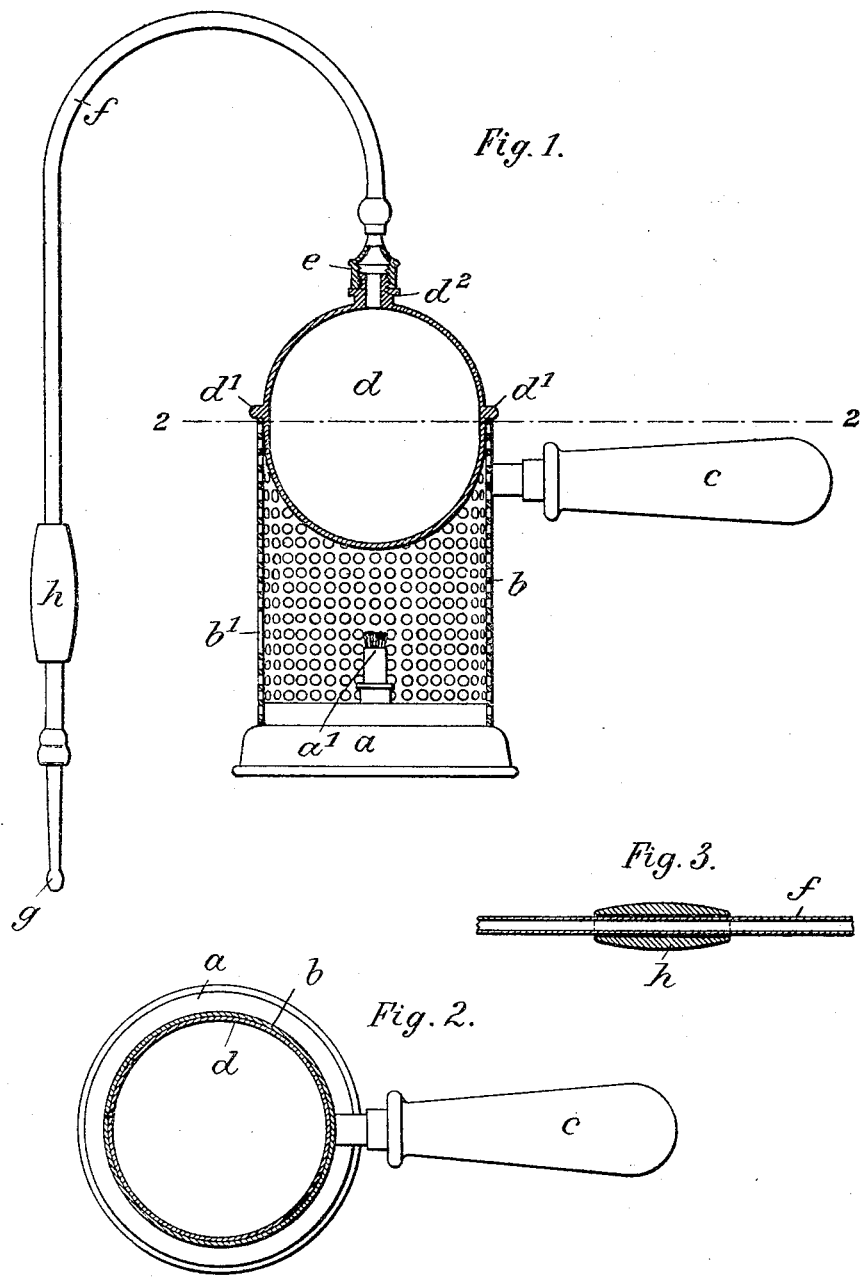

FREDERICK KOECHEL, OF NEW YORK, N. Y.

INSECT-DESTROYER.

No. 801,460.      Specification of Letters Patent.      Patented Oct. 10, 1905.

Application filed April 6, 1905. Serial No. 254,235.

*To all whom it may concern:*

Be it known that I, FREDERICK KOECHEL, a citizen of Germany, residing at New York city, Manhattan, county and State of New York, have invented new and useful Improvements in Insect-Destroyers, of which the following is a specification.

This invention relates to an insect-destroyer for exterminating insects, bugs, and other vermin by means of live steam which can be readily delivered into the cracks or crevices within which the vermin are nested.

In the accompanying drawings, Figure 1 is a vertical longitudinal section, partly in elevation, of my improved insect-destroyer; Fig. 2, a horizontal section on line 2 2, Fig. 1; and Fig. 3, a longitudinal section through the rubber tube and handle.

The letter $a$ indicates the reservoir of a lamp from which projects upwardly a tubular foraminated shell $b$, having a rigid handle $c$. Opposite to burner $a'$ the shell $b$ is provided with an opening $b'$ of an increased size for blowing out the flame. Upon the upper edge of shell $b$ is removably seated, by means of a circumferential bead $d'$, a boiler $d$, which is of globular shape and projects partly into and partly above the shell. At the top the boiler $d$ has a threaded nipple $d^2$, engaged by a threaded coupling $e$ of a flexible tube $f$, that carries a discharge-nozzle $g$. The tube $f$ is surrounded back of the nozzle by a tubular sleeve $h$, which constitutes a handle and which is slidable upon the tube.

In use the tube $f$ is uncoupled from the boiler, the latter is filled with water through nipple $d^2$, and the tube is recoupled. The lamp being lighted, the steam generated will pass through tube $f$ to be ejected through nozzle $g$. The latter is directed toward the crevices or corners where the insects or vermin are congregated, so that the latter will be rapidly destroyed by the issuing live steam. Normally the handle $h$ is so adjusted as to embrace the tube $f$ directly back of the nozzle and permit the latter to be readily pointed in various directions. Should, however, the vermin be accumulated in deep or inaccessible cracks or holes, the handle $h$ is pushed backward more or less upon the tube, so that a flexible section of the latter is exposed between the handle and the nozzle. This exposed flexible section permits the nozzle to be inserted into sinuous passages, cracks, or crevices up to the handle, the latter serving during the issuance of the steam to direct the nozzle and hold the tube in position.

What I claim is—

An insect-destroyer composed of a lamp, a tubular foraminated shell mounted thereon, a beaded globular boiler removably supported upon the shell and having a nipple, a flexible tube coupled to the nipple, a discharge-nozzle on the tube, and a sleeve slidable upon the tube back of the nozzle, substantially as specified.

Signed by me at New York city, Manhattan, New York, this 5th day of April, 1905.

FREDERICK KOECHEL.

Witnesses:
    WILLIAM SCHULZ,
    FRANK V. BRIESEN.